G. W. HOOKER.
BOILER FLUE TURNER AND BEADER.
APPLICATION FILED AUG. 21, 1919.
1,365,915.
Patented Jan. 18, 1921.
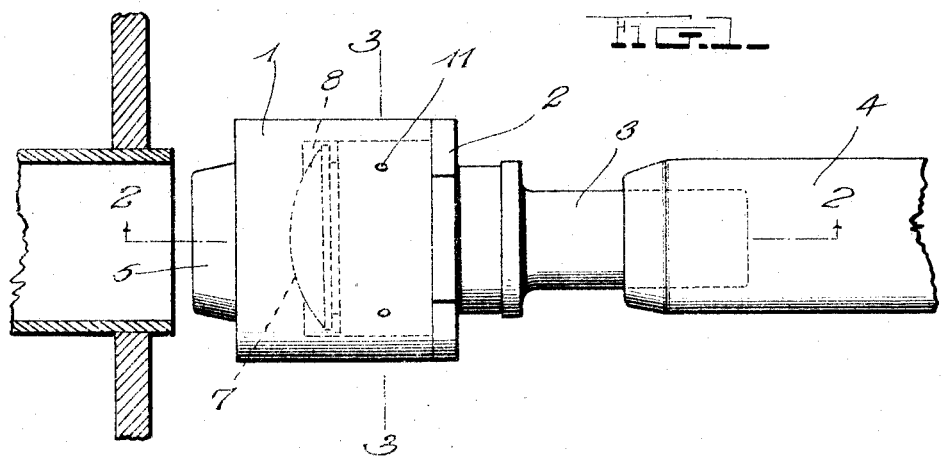
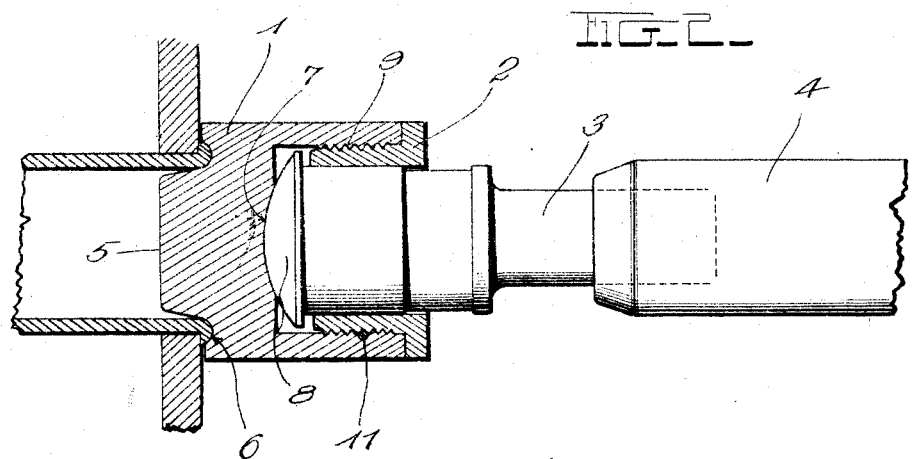
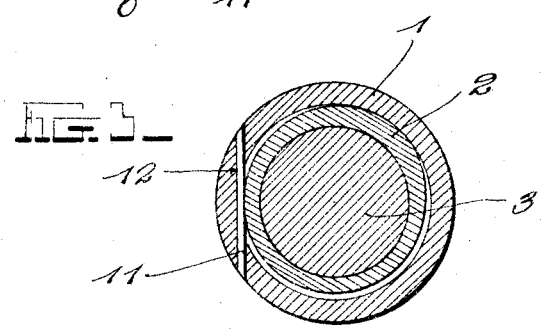
Witness
H. Woodard
Inventor
George W. Hooker
By H. B. Wilson &co
Attorneys

UNITED STATES PATENT OFFICE.

GEORGE W. HOOKER, OF NORTH LITTLE ROCK, ARKANSAS, ASSIGNOR OF ONE-HALF TO ALBERT KROHN, OF NORTH LITTLE ROCK, ARKANSAS.

BOILER-FLUE TURNER AND BEADER.

1,365,915.  Specification of Letters Patent.  Patented Jan. 18, 1921.

Application filed August 21, 1919. Serial No. 318,934.

*To all whom it may concern:*

Be it known that I, GEORGE W. HOOKER, a citizen of the United States, residing at North Little Rock, in the county of Pulaski and State of Arkansas, have invented certain new and useful Improvements in Boiler-Flue Turners and Beaders; and I do declare the following to be a full, clear, and exact description of the invention, such as will enable others skilled in the art to which it appertains to make and use the same.

This invention relates to improvements in boiler flue turners and beaders, and it is particularly designed to be driven by a pneumatic hammer.

The principal object of the invention is to provide a tool of the above mentioned character which is simple in construction, easy to manipulate, strong, durable, efficient and comparatively inexpensive to manufacture.

Other objects and advantages of the invention will be apparent during the course of the following description.

In the accompanying drawings forming a part of this specification and in which like numerals are employed to designate like parts throughout the same, Figure 1 is a side elevation of my tool, showing the tool before insertion into a boiler tube.

Fig. 2 is a view similar to Fig. 1, partly in section, showing the tube after it is finished.

Fig. 3 is a transverse section on the line 3—3 of Fig. 1.

In carrying out my invention I employ a substantially cylindrical hollow internally threaded body 1 which has one of its ends closed and its other end open. The closed end has its outer or working face formed in such a manner as to turn and bead the end of a boiler tube when operated therein, and the inner face of the said closed end is provided with a concave seat. In the open end of the body 1, I insert a ring nut 2 which, when in operative position, has its innermost point spaced away from the seat in the inner face of the closed end of the body 1, thereby permitting a plunger rod 3 to be reciprocated between the inner end of the ring nut and the seat in the closed face of the body 1, thereby limiting the reciprocatory movement of said plunger rod. The shank end of the plunger rod is received within a chuck or socket 4 of any approved form driven by a pneumatic hammer (not shown) and the body 1 allowed to project into the end of the tube, so as to upset or turn the end of the pipe into the desired shape.

The body 1 is preferably made of well tempered tool steel and is cylindrical as shown. Its closed end is provided with a guide extension 5 of less diameter than the body proper and is surrounded by an annular bead forming groove 6. The inner face of the closed end is provided with a concave seat 7 which engages with the flanged convex head 8 of the plunger rod 3. As shown the body 1 is internally threaded at 9 to engage the flanged ring nut 2, which is inserted therein and has its inner end spaced away from the seat 7 to form a space, which permits reciprocatory movement of the plunger head 8 therein.

In order to guard against accidental displacement of the ring nut 2 from the body 1, I preferably insert a locking pin 11 in the slot 12 between the said members. This pin is readily removable, from the slot 12, thus permitting removal of the ring nut 2 from the hollow body when desired.

When it is desired to form a bead on a boiler tube, the guide extension 5 is entered into the tube in the manner shown in Fig. 2. The shank portion of the plunger rod 3 is secured in the socket 4 of pneumatic hammer (not shown) which, when set into operation causes the convex flanged head 8 of the plunger rod to reciprocate between the inner end of the ring nut 2 and the concave seat 7 the movement of the head 8 being limited. Thus, it will be seen that a hammering effect will be imparted to the working end of the hollow body 1 and the end of the tube upset and a bead formed thereon as shown in Fig. 2 of the drawing.

All of the parts of my tool are made of well tempered tool steel, are easily removable for repairing, and are readily reassembled.

Although I have described my tool as being used with a pneumatic hammer, I desire it to be understood that it may be actuated by various other similar machines or motors.

It is to be understood that the form of my invention herein shown and described is to be taken as a preferred embodiment of the same, and that various changes in the shape, size, and arrangement of parts may be resorted to without departing from the spirit of the invention or the scope of the subjoined claim.

I claim:

A flue beading tool comprising a hollow internally screw-threaded body having one of its ends closed and its opposite end open, said closed end being provided on its outer face with bead forming means, the inner face of said closed end having a concave seat formed therein, a ring nut threaded into the screw-threaded portion of the hollow body, its inner end being spaced away from the concave seat, and a plunger rod provided with a portion adapted to fit snugly in the ring nut, said plunger rod being also provided with a head having a convex portion to engage the concave seat and a flange to engage the inner end of the ring nut to limit the movement of the said plunger rod, said plunger being further provided with a portion for attachment to a motor.

In testimony whereof I have hereunto set my hand.

GEORGE W. HOOKER.